United States Patent
Huchet et al.

(10) Patent No.: US 9,434,323 B2
(45) Date of Patent: Sep. 6, 2016

(54) METHOD OF FITTING AN ATTACHMENT ONTO A PROFILED STRIP, INTERMEDIATE FASTENING DEVICE FOR FASTENING AN ATTACHMENT ONTO A PROFILED STRIP, GLAZING PANE AND USE OF SAID DEVICE

(75) Inventors: Gerard Huchet, Autreches (FR); Ricardo Garcia, Col. Santa Fe (MX)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 196 days.

(21) Appl. No.: 13/127,736

(22) PCT Filed: Nov. 2, 2009

(86) PCT No.: PCT/FR2009/052115
§ 371 (c)(1),
(2), (4) Date: Sep. 16, 2011

(87) PCT Pub. No.: WO2010/052418
PCT Pub. Date: May 14, 2010

(65) Prior Publication Data
US 2012/0045608 A1 Feb. 23, 2012

(30) Foreign Application Priority Data

Nov. 5, 2008 (FR) ..................................... 08 57506

(51) Int. Cl.
*A44B 1/04* (2006.01)
*F16B 2/20* (2006.01)
(Continued)

(52) U.S. Cl.
CPC ........... *B60R 13/0206* (2013.01); *F16B 2/245* (2013.01); *F16B 5/121* (2013.01); *F16B 5/0635* (2013.01); *Y10T 29/49959* (2015.01); *Y10T 428/24008* (2015.01)

(58) Field of Classification Search
CPC .......... B60R 13/02; F16B 5/12; F16B 5/125; F16B 5/128; F16B 5/121; F16B 5/123
USPC ............................................................ 24/293
See application file for complete search history.

(56) References Cited

U.S. PATENT DOCUMENTS 2,499,637 A * 3/1950 Flora ............................... 24/295
2,632,929 A * 3/1953 Poupitch ......................... 24/290
(Continued)

OTHER PUBLICATIONS

U.S. Appl. No. 13/876,758, filed Mar. 28, 2013, Grandgirard, et al.
(Continued)

*Primary Examiner* — Robert J Sandy
*Assistant Examiner* — Matthew Sullivan
(74) *Attorney, Agent, or Firm* — Oblon, McClelland, Maier & Neustadt, L.L.P.

(57) ABSTRACT

A method of fitting an attachment, or a trim, onto a portion of a profiled strip, or onto a portion of a profiled strip fastened to a periphery of a glazing pane, a fitting operation being carried out by an intermediate fastening device. The intermediate fastening device includes at least one clip including having at least one upstream cooperating part configured to cooperate with the profiled strip and a downstream cooperating part configured to cooperate with the attachment. The method includes fastening the intermediate fastening device onto the profiled strip. The intermediate fastening device includes an upstream cooperating part having a plurality of deformable catching tabs, the tabs being deformed by applying a force to the ends of the tabs toward the material of the profiled strip in two opposed directions so as to penetrate the material of the profiled strip during the fastening.

10 Claims, 4 Drawing Sheets

(51) Int. Cl.
*B23P 11/00* (2006.01)
*B32B 7/08* (2006.01)
*F16M 13/02* (2006.01)
*B60R 13/02* (2006.01)
*F16B 2/24* (2006.01)
*F16B 5/12* (2006.01)
*F16B 5/06* (2006.01)

(56) References Cited

U.S. PATENT DOCUMENTS

| | | | | |
|---|---|---|---|---|
| 2,655,239 | A | * | 10/1953 | Kenlock .................. 52/204.597 |
| 2,786,249 | A | * | 3/1957 | Poupitch ........................ 24/293 |
| 3,034,616 | A | * | 5/1962 | Meyer ............................. 52/466 |
| 3,673,643 | A | * | 7/1972 | Kindell .......................... 24/458 |
| 3,854,269 | A | | 12/1974 | Hancock |
| 3,977,048 | A | * | 8/1976 | Benedetti ....................... 24/293 |
| 4,630,338 | A | * | 12/1986 | Osterland et al. ............. 24/293 |
| 5,533,237 | A | * | 7/1996 | Higgins .......................... 24/289 |
| 5,774,949 | A | * | 7/1998 | Cornell et al. ................. 24/293 |
| 5,803,532 | A | * | 9/1998 | Karuppaswamy et al. .................... 296/187.05 |
| 6,668,430 | B2 | * | 12/2003 | Ichimaru ........................ 24/457 |
| 6,691,380 | B2 | * | 2/2004 | Vassiliou ........................ 24/295 |
| 6,857,168 | B2 | * | 2/2005 | Lubera et al. ................. 24/293 |
| 7,407,224 | B2 | * | 8/2008 | Okabe et al. .................. 296/210 |
| 7,874,775 | B2 | * | 1/2011 | Hullmann et al. ............ 411/173 |
| 7,918,058 | B2 | | 4/2011 | Debailleul et al. |
| 8,038,167 | B2 | * | 10/2011 | Slobodecki et al. ........ 280/728.2 |
| 8,646,155 | B2 | * | 2/2014 | Ribes Marti ................... 24/295 |
| 2003/0024078 | A1 | * | 2/2003 | Vassiliou ........................ 24/295 |
| 2008/0028577 | A1 | * | 2/2008 | Soman et al. ................. 24/293 |
| 2008/0271297 | A1 | * | 11/2008 | Dubost ........................... 24/293 |
| 2011/0314642 | A1 | * | 12/2011 | Diez Herrera ................. 24/293 |

OTHER PUBLICATIONS

International Search Report Issued Feb. 17, 2010 in PCT/FR09/052115 filed Nov. 2, 2009.
U.S. Appl. No. 13/017,425, filed Jan. 31, 2011, Lefevre, et al.

* cited by examiner

METHOD OF FITTING AN ATTACHMENT ONTO A PROFILED STRIP, INTERMEDIATE FASTENING DEVICE FOR FASTENING AN ATTACHMENT ONTO A PROFILED STRIP, GLAZING PANE AND USE OF SAID DEVICE

CROSS REFERENCE TO RELATED APPLICATIONS

The present application is the U.S. counterpart of WO 10/052418, which claims priority to French Application No. 08 57506 filed on Nov. 5, 2008, the entire contents of each of which are hereby incorporated herein by reference.

BACKGROUND OF THE INVENTION

1. Field of the Invention

The present invention relates to the field of producing profiled strips on glazing panes.

It relates more particularly to an intermediate fastening device and to its fitting method, for the fitting of an attachment, such as a sealing trim, onto a portion of a profiled strip, and in particular onto a portion of a profiled strip fastened to the periphery of a glazing pane, this fitting operation being carried out by means of an intermediate fastening device comprising at least one clip having at least an upstream cooperating part intended to cooperate with said profiled strip and a downstream cooperating part intended to cooperate with said attachment.

2. Background

The prior art teaches, from International patent application WO 2005/033526, a trim clip-fastening system for a profiled strip using a flexible clip having a simple first protrusion intended to be inserted into a simple first groove of the profiled strip and a more complex second protrusion, in the form of a hook, intended to be inserted into a likewise more complex groove of the profiled strip by deformation of the flexible clip. The clip is thus hooked onto the profiled strip. A profiled strip pinching effect is also obtained by having a slightly shorter distance between the two protrusions of the clip than between the two grooves of the profiled strip.

To fasten the trim, the strip is firstly introduced into a protrusion of the clip and then the clip is again deformed in order to allow the trim to pass over a projection of the profiled strip.

Now, it turns out that this deformation is exactly contrary to the deformation enabling the clip to be hooked onto the profiled strip.

Once the fitting operation has been completed, the flexible clip is thus permanently subjected to opposed tensile forces that tend both to keep it hooked onto the profiled strip and to keep the trim clipped onto the clip.

This system is not satisfactory since the vibrations experienced by the profiled strip during operation of the vehicle, particularly on a bumpy road, cause deformations of the seal (profiled strip) that may result in the permanently tensioned flexible clip becoming detached and consequently may lead to the trim being lost.

Also known, from International patent application WO 2007/003823, is an intermediate fastening device of the type described above.

According to that document, the upstream cooperating part includes at least a projecting male element or a hollow female element, this element cooperating with a corresponding hollow female element or a corresponding projecting male element respectively provided in the profiled strip, said hollow female element having internal dimensions at least partly smaller than the external dimensions of said projecting male element.

This cooperation is thus of the "mortise-and-tenon" type with a rubbing effect between at least one part of the surfaces of the elements.

An important advantage of this device over the previous one lies in the reliability of the fastening system: it allows reliable retention of the trim, including under extreme, especially vibration, conditions.

However, this system complicates the design of the profiled strip and necessitates designing a particular profiled strip that has particular male or female areas.

In particular, this system requires the clip to be positioned very precisely in order for the upstream cooperating part to cooperate correctly with the corresponding part provided in the profiled strip.

The prior art also teaches, from U.S. Pat. No. 3,869,760, a clip having flexible tabs, these tabs being spaced apart so as to pass a protrusion into which the ends of the tabs penetrate when an extraction force is applied to the clip.

The prior art furthermore teaches, from International patent application WO 2008/084076, a trim clip-fastening system for a profiled strip, this profiled strip having areas provided for receiving retaining elements of the clip, these provided areas taking the form of holes for retaining the arrow-shaped retention elements of the clip.

In order for there to be cooperation between the clip and the profiled strip, it is therefore necessary to position the clip precisely with respect to the profiled strip in order for the retention elements of the clip to correctly penetrate into the receiving means of the profiled strip. Furthermore, the encapsulation mold must have moving parts at the place of each clip in order to allow it to be demolded.

SUMMARY

The objective of the invention is to alleviate the drawbacks of the prior art by providing a system for fastening a clip onto a profiled strip that does not require the clip to be positioned extremely precisely with respect to the profiled strip when clip-fastening the clip onto the profiled strip.

Thus, the clip-fastening of the clip onto the profiled strip may be automated, i.e. carried out by a robot.

However, it is necessary for the clip-fastening to continue to be able to be carried out manually so as to allow a trim to be repositioned on a new glazing pane when replacing the pane without replacing the trim in a repair shop or to replace a trim without replacing the pane in a repair shop.

The present invention thus relates in its widest acceptance to a method of fitting an attachment, such as a trim, onto a portion of a profiled strip, and in particular onto a portion of a profiled strip fastened to the periphery of a glazing pane. This fitting operation is carried out by means of an intermediate fastening device comprising at least one clip having at least one upstream cooperating part intended to cooperate with said profiled strip and a downstream cooperating part intended to cooperate with said attachment, said method including a step of fastening said intermediate fastening device onto said profiled strip. Said intermediate fastening device includes an upstream cooperating part having a plurality of catching tabs joined by a base, the distal end of each tab being deformable, said distal ends of the tabs being deformed by applying a force to the ends of said tabs toward the material of said profiled strip in two opposed directions so as to penetrate the material of said profiled strip during the fastening step.

One important feature of the present invention consists in providing for the upstream fastening part to cooperate with a cavity of the profiled strip, but not in providing this cavity, i.e. without producing beforehand a slot or hole in the material of the profiled strip—it is the upstream fastening part which itself digs out the cavity during the operation of clip-fastening the clip onto the profiled strip. Therefore, the mold for forming the profiled strip is simple, with no moving part and no associated mechanism.

One major advantage of the invention lies in the fact that it is unnecessary to position the intermediate fastening device very precisely with respect to the profiled strip. Of course, the penetration takes place in a chosen area of the profiled strip, which may be provided and may have a protrusion for example, as explained below, but this area is relatively large compared with the size of the intermediate fastening device and may even be present along the entire profiled strip. Thus, in this case, it is unnecessary for the intermediate fastening device to be positioned very precisely along the length of the profiled strip.

Furthermore, it is possible, if required, to remove the clip and position it close to its previous location on the strip is damaged if the latter is damaged, or to remove the clip if this too is damaged and to position a new clip close to the location of the previous one.

Preferably, the ends of the catching tabs penetrate into the material of the profiled strip over a depth p of at least 0.5 mm and more preferably at least 1 mm, or even at least 2 mm.

Thus, only the distal ends of the catching tabs (i.e. the ends on the opposite side from where the tabs join the base) are deformed by applying the deformation force.

In a preferred variant of the invention, said penetration takes place by applying a force to said tabs toward the material of said profiled strip in two opposed directions manually or by means of a tool, but not using a complementary fastening means (such as a screw) fastening the fastening device to the profiled strip.

Preferably, said clip has a substantially flat base, said catching tabs being directed, at least where they join said base, substantially perpendicular to said base.

Preferably, said profiled strip has a protrusion with a width smaller than the base of said clip and said catching tabs penetrate the material of said protrusion.

Moreover, said profiled strip preferably has a protrusion with a height at least equal to and preferably greater than the height of said clip, said tabs penetrating the material of said protrusion.

This protrusion may be present over the entire length of the profiled strip or at least in one or more areas each having a length of at least 1.5 times the length of the intermediate fastening device.

According to the invention, the clip is positioned astride the protrusion before the ends of said tabs penetrate the material of said protrusion.

The present invention also relates to an intermediate fastening device for fitting an attachment, such as a trim, onto a portion of a profiled strip, and in particular onto a portion of a profiled strip fastened to the periphery of a glazing pane, i.e. an intermediate fastening device for implementing the method according to the invention. This device comprises at least one clip having at least an upstream cooperating part intended to cooperate with said profiled strip and a downstream cooperating part intended to cooperate with said attachment. Said upstream cooperating part has a plurality of catching tabs joined by a base, the end of each tab being deformable, said distal ends of the tabs being deformed by applying a force to the ends of said tabs toward the material of said profiled strip in two opposed directions in order to penetrate the material of said profiled strip during the step of fastening the clip onto said profiled strip.

Preferably, this device furthermore has a substantially flat base, said tabs being oriented substantially perpendicular to said base, or in any case with an angle $\alpha$ of 45° or less, or even with an angle $\alpha$ of 20° or less or even with an angle $\alpha$ of 15° or less, relative to the perpendicular to the base.

Moreover, said tabs are preferably arranged in diametrically opposed pairs relative to a central plane of longitudinal symmetry of said base.

Furthermore, said tabs each preferably have at least one hook-shaped part bent away from said base, preferably at an angle of between 30° and 70° relative to the perpendicular to said base.

Preferably, said tabs terminate, at their ends that penetrate into the material of the profiled strip, in a plurality of pointed teeth, in particular triangular teeth, preferably 3 or even 4 such teeth.

The present invention also relates to a glazing pane having at least one intermediate fastening device according to the invention for the fitting of an attachment, such as a trim, onto a portion of a profiled strip, and in particular onto a portion of a profiled strip fastened to the periphery of the glazing pane.

The present invention also relates to the use, in particular in a vehicle assembly shop or in a vehicle repair shop, of the intermediate fastening device according to the invention for fitting an attachment, such as a trim, onto a profiled strip, and in particular onto a portion of a profiled strip fastened to the periphery of a glazing pane.

Advantageously, the system according to the invention makes it possible to fasten at least one clip, and preferably several clips, for fastening an intermediate part onto a profiled strip, without this profiled strip being of complex shape and difficult to design and produce (especially by molding).

BRIEF DESCRIPTION OF THE SEVERAL VIEWS OF THE DRAWINGS

The present invention will be better understood on reading the following detailed description of nonlimiting exemplary embodiments and on examining the figures appended hereto.

DETAILED DESCRIPTION OF THE INVENTION

The present invention relates to an intermediate fastening device 1 for fitting an attachment 2, such as a trim 2', onto a portion of a profiled strip 3, and in particular onto a portion of a profiled strip fastened to the periphery of a glazing pane 4, in particular a vehicle glazing pane.

Figure 1:
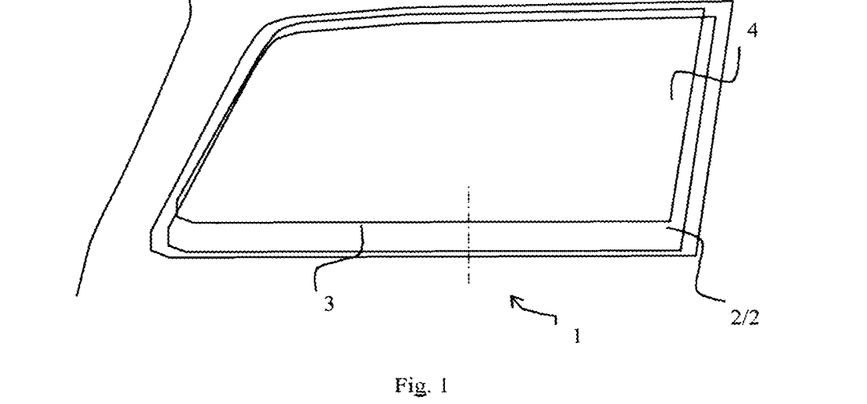
FIG. 1 illustrates a side view of the rear end of a vehicle provided with a glazing pane having a trim fastened using an intermediate fastening device according to the invention.

FIG. 1 illustrates a rear end of a motor vehicle provided with a glazing pane 4 fixed to the periphery of which is a profiled strip 3 made of a flexible polymer material.

The constituent polymer material of the profiled strip 3 may be a thermoplastic (PVC, TPE, . . . ), a polyurethane or a synthetic rubber of the EPDM type, or any other suitable material.

The profiled strip 3 was manufactured by employing what is called an "encapsulation" manufacturing process as it includes a step of molding the profiled strip 3 in a molding device, between two molding elements, one molding element receiving the inner face of the glazing pane and one molding element receiving the outer face of the glazing pane, these two molding elements being closed up on each other during the molding step.

In FIG. 1, the profiled strip 3 is placed over the entire periphery of the glazing pane 4, but this profiled strip could just as well be positioned only over a portion of the periphery of the pane or over any portion of the pane.

To improve the aesthetic appearance of the window, one portion of the profiled strip 3 visible from the outside of the vehicle is masked by a trim 2' which here is based only in the bottom part of the pane, but could also be placed over the entire periphery of the glazing pane 4 and/or over any portion of the pane.

The glazing pane 4 may be monolithic glazing, i.e. consisting of a single sheet of material, or may be composite glazing, i.e. consisting of several sheets of material between which at least one layer of adherent material is inserted in the case of laminated glazing, or at least one intermediate space in the case of multiple glazing (double glazing, triple glazing, etc.). The sheet or sheets of material may be mineral, especially glass, or organic, especially plastic.

In the case of a vehicle window, the glazing pane generally has at least partly on its periphery a decorative strip, not illustrated here. This decorative strip is generally formed by depositing an enamel on the inner face of the glazing or on an intermediate face of the glazing in the case of composite glazing, but it could also result from partial and/or peripheral coloration of a sheet of material used, especially a sheet of organic material.

Figure 2:
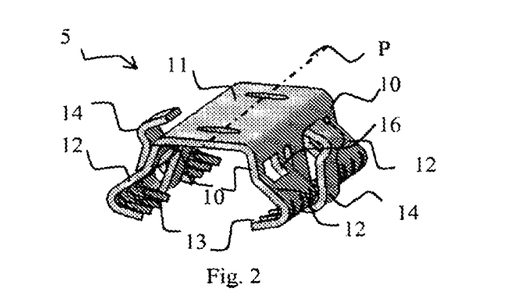
FIG. 2 illustrates a perspective view of a clip of the intermediate fastening device according to the invention.
Figure 3:
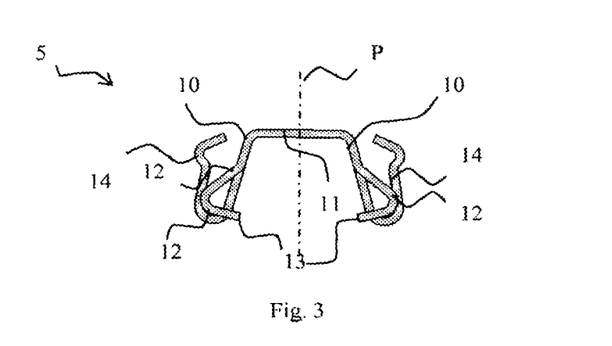
FIG. 3 illustrates a front view of the clip of FIG. 2.

The intermediate device 1 according to the invention comprises, for fastening the trim 2', at least one clip 5, such as for example the one shown in FIGS. 2 and 3, which is more rigid than the profiled strip 3, and preferably several clips 5 distributed along the trim 2' depending on the length of said trim.

Each clip 5 has, on the one hand, at least an upstream cooperating part intended to cooperate between the clip and said profiled strip 3 and, on the other hand, a downstream cooperating part intended to cooperate between the clip and said trim 2'.

In one version of the invention (not illustrated here), the clip(s) is (are) made as one piece with the attachment (trim). In this version, the cooperation between the clip and said trim thus takes place via the constituent material of the single attachment: trim incorporating the clip(s).

In this version of the invention, this single attachment may be made of metal or a metal alloy, or may be made of a plastic. When the single attachment is made of a plastic, it may be manufactured by molding and covered, in its visible part after the glazing has been fitted, with a paint having the appearance of a metal.

In all the versions of the invention illustrated here, on the one hand, the trim 2' and, on the other hand, the clip(s) 5 constitute different parts that are assembled together only at the moment when the trim 2' is fitted against the profiled strip fastened beforehand against the lower edge of the glazing pane 4 (for example by encapsulation) or over all or part of its perimeter.

In all these versions, the upstream cooperating part of the clip is fastened to the profiled strip 3 before the trim 2' is fastened to the clip thanks to the downstream cooperating part.

The clip is chosen to be made of a material having a greater stiffness than that of the profiled strip. The clip may thus be made of a metal or a metal alloy, or else it may be made of a plastic. It has a longitudinal plane of symmetry P along its length.

According to the invention, the upstream cooperating part of the clip 5 has a plurality of deformable catching tabs 10, said tabs being deformable so as to penetrate the material of said profiled strip 3 during the step of fastening the clip 5 onto said profiled strip 3 (and therefore also partly into the profiled strip).

The clip 5 according to the invention has a substantially flat base 11 that joins the tabs 10, said tabs 10 being directed substantially perpendicular to said base 11, downward in the figures, or in any case with an angle of 45° or less, relative to the perpendicular to the base.

Here there are four tabs 10 arranged diametrically opposed in pairs relative to the plane P.

Each tab 10 terminates in a hook-shaped part 12 which is not bent toward the base 11 but away from it. It is this hook-shaped part 12 that constitutes the distal end of each tab, which is deformed by applying the deformation force toward the material of said profiled strip 3 in two opposed directions in order to penetrate the material of said profiled strip 3 during the fastening step.

Figure 4:
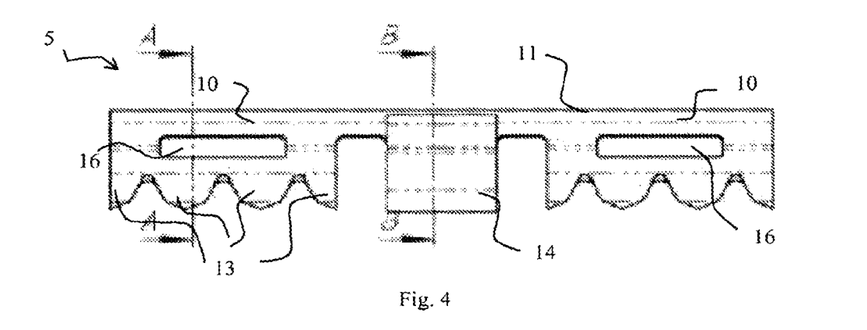
FIG. 4 illustrates a side view of a clip of the intermediate fastening device according to the invention.
Figure 5:
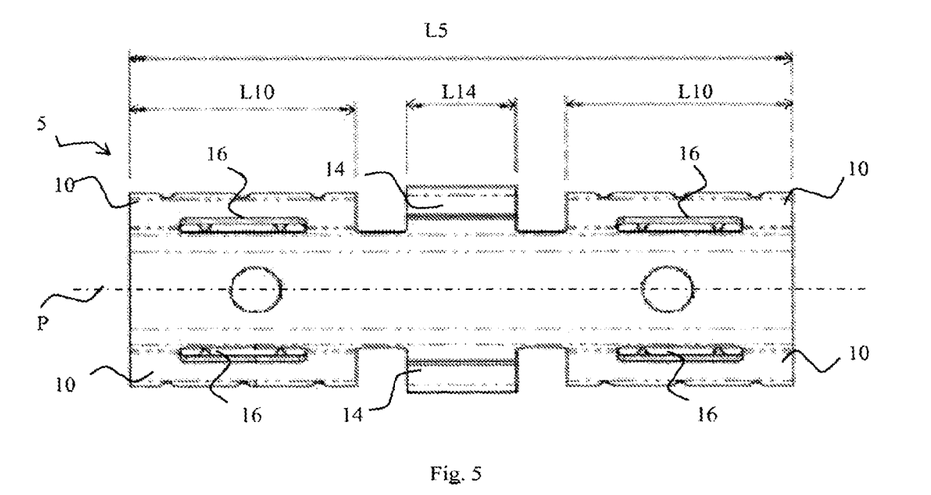
FIG. 5 illustrates a top view of the clip of FIG. 4.

Each hook-shaped part 12 terminates at its end in a plurality of pointed teeth 13, two solid triangular teeth at the center of the hook and two triangular semi-teeth at the lateral ends of the hook, as may be seen in FIG. 4.

The downstream cooperating part of the clip 5 has a plurality of fins 14, forming, at their ends 15, stops for resilient retaining means provided on the inner face of the trim 2'.

In the embodiment illustrated in FIGS. 4 to 7, the clip 5 has a length L5 from about 30 mm, an overall width g5 of about 10 mm and an overall height h5 of about 5 mm.

The tabs 10 each have a length L10 of about 10 mm and the fins 14 each have a length L14 of about 5 mm.

The base 11 has a width g11 of about 4.5 mm and a distance g13 between the ends of the facing teeth 13 relative to the plane P is about 5.5 mm.

Figure 6:
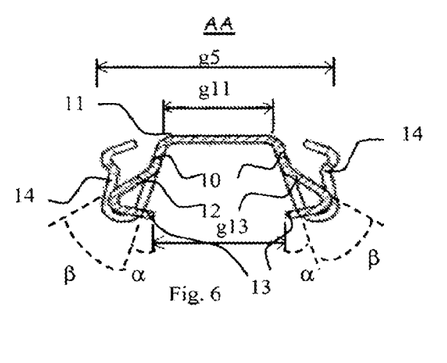
FIGS. 6 and 7 illustrate a sectional view along AA and a sectional view along BB of FIG. 4, respectively.

As may be seen in FIG. 6, the tabs 10 are oriented at the point where they join the base 11 with an angle α relative to the longitudinal plane of symmetry, this angle α here being around 15° relative to the perpendicular to the base 11.

Moreover, the hooks 12 are oriented at the point where they join their tabs 10 at an angle β relative to their tabs 10, this angle β here being around 35°.

The hook-shaped parts 12 are therefore oriented, before the deformation, at the point where they join their tabs 10, at an angle α+β relative to the longitudinal plane of symmetry, this angle α+β here being around 50° relative to the perpendicular to the base 11.

Since the distal ends of the tabs 10 are bent before application of the deformation, the deformation applied consists in unbending them.

After the deformation, the angle β is zero.

To facilitate this deformation, it is preferable to provide at least one slit 16 in each tab 10.

It is important for the clip to be able to be positioned astride the protrusion without modifying its shape. The tabs and a fortiori their distal ends must not impede this astride positioning of the clip—the ends of the tabs are deformed only after this astride positioning of the clip.

Figure 7:
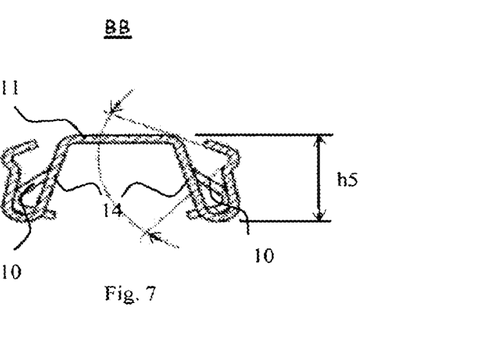

As may be seen in FIG. 7, the clip 5 also has a transverse plane of symmetry, i.e. the plane along BB, which is perpendicular to the plane P.

In FIGS. 8 to 12 a profiled strip 3 is illustrated in cross section, i.e. in section along the dot-dash line shown in FIG. 1.

This profiled strip 3 has a U-shaped cavity 31 in cross section, for receiving the glazing pane 4, which is not illustrated in these figures.

This profiled strip 3 also has a lip 32 for connection to the body of the vehicle.

This profiled strip 3 also has a protrusion 30 placed between the cavity 31 and the lip 32.

This protrusion 30 has a width (measured along the transverse direction) smaller than the width 111 of the base 11 of said clip and a height at least equal to and preferably 5 to 10% greater than the height h5 of said clip.

In the version illustrated here, the side walls of the protrusion are not vertical and have the same angle of inclination as the tabs 10 with respect to the base 11.

Figure 8:
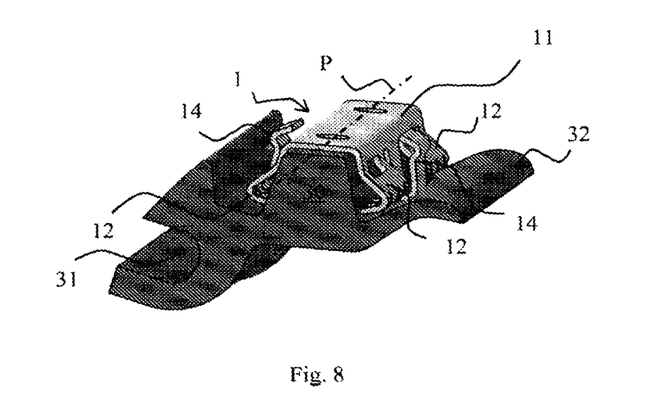
FIGS. 8 and 9 show a perspective view and a front view, respectively, of the positioning of the clip of FIG. 2 positioned on the profiled strip before penetration of the profiled strip.
Figure 9:
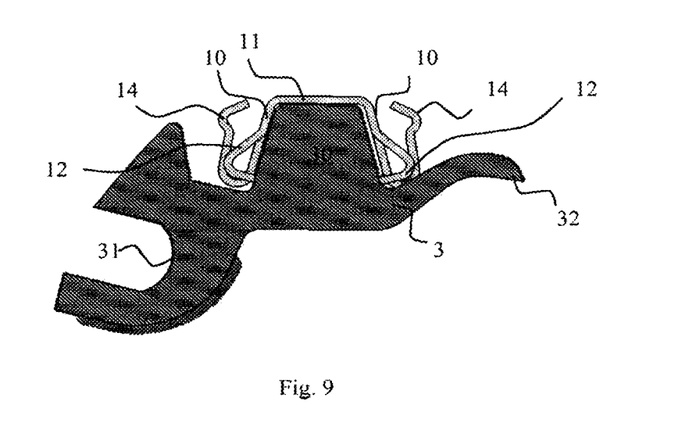

To fit the trim 2' (attachment) onto the portion of the profiled strip 3, it is firstly necessary to position the clip 5 of the intermediate device astride the protrusion 30, as illustrated in FIGS. 8 and 9. In this position, the clip 5 substantially covers the upper wall and the side walls of the protrusion 30. The base 11 rests on the upper part of the protrusion and the tabs 10 follow the inclination of the side walls of the protrusion. However, in this position, the teeth 13 of the hooks 12 of the tabs 10 have not yet penetrated the material of the protrusion 30.

Figure 10:
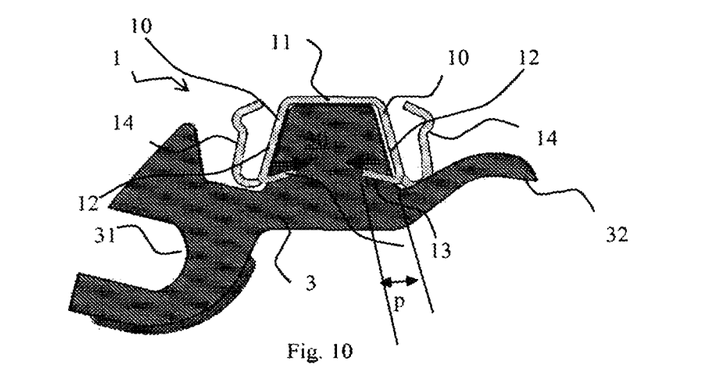
FIG. 10 illustrates a sectional view of the profiled strip at the catching tabs of the clip of FIGS. 2 and 3 during the operation of clip-fastening the clip onto the profiled strip.

Secondly, a force, illustrated by the two double arrows in FIG. 10, is applied against the tabs 10 toward the protrusion 30 so as to make the teeth 13 of the hooks 12 penetrate into the material of the protrusion 30 over a depth p (illustrated here on only one side for greater simplicity), of at least 0.5 mm, or at least 1 mm and preferably at least 2 mm (here, the depth p is 2.2 mm).

This depth p corresponds substantially to the width of the upturn of the hooks 12 relative to the tabs 10, i.e. the hooks 12 are pressed into the material of the protrusion 30 until the angle point, which determines the start of the hook at the end of the tab, comes into contact with the side wall of the protrusion. Given that the material of the profiled strip 3 is more flexible than that of the tabs, it is even possible to apply a force to make the tabs 10 facing each other contract in such a way that the protrusion 30 is slightly compressed—this provides a means for visually ensuring that the tabs have correctly penetrated the protrusion.

The deformation of two tabs facing each other act as kind of jaws gripping the protrusion 30.

It is important to note that the deformation applied to the tabs, in order to make the hooks penetrate into the protrusion, is a plastic deformation: once the penetration force is no longer applied, the hooks remain in place in the protrusion 30. Only a removal (or bending) force contrary to the direction of the penetration (unbending) force and of at least equal intensity may allow the tabs 10 to deform in the opposite direction and allow the clip to be removed (for example for recycling the glazing).

It is also possible to measure the depth p relative to the surface of the protrusion 30 when the clip is removed by taking a cross section through the protrusion at the point of penetration of the teeth.

The penetration force may be applied manually, for example by taking two tabs 10 facing each other pinched between the thumb and index finger.

The penetration force may also be applied using pliers, for example by taking two tabs 10 that are facing each other pinched between two arms of the pliers.

During this second step, the fins 14 remain immobile. If pliers are used, it is important that the arms of the pliers do not deform the fins 14.

Figure 11:
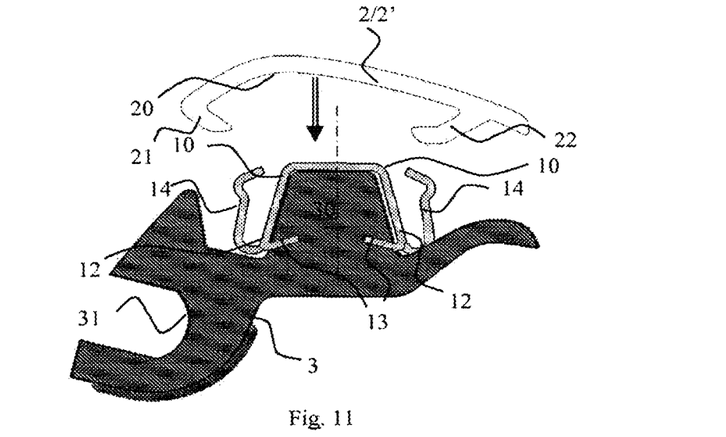
FIG. 11 illustrates a sectional view of the profiled strip at the catching tabs of the clip of FIG. 2 during the positioning of the trim.

In a third and final step, illustrated in FIG. 11, the trim 2' is positioned on the clip 5 and is clipped onto said trim by applying a clip-fastening force, illustrated by the double arrow, toward the upper wall of the protrusion 30 substantially perpendicular to said wall.

The inner face 20 of the trim, that which is not visible once the glazing pane has been fitted into the bay and is therefore turned toward the clip, is provided at its lateral ends with two prongs 21, 22 oriented back toward the center of the trim (and therefore toward the protrusion 30).

These prongs are provided over the entire length of the trim or over only a portion of this length, for example at regular intervals along this length in order to save on the constituent material of the trim.

The prong 21 closest to the cavity 31 has a single return oriented at an angle slightly less than 90° (around 85°) while the prong 22, closest to the lip 32, has a double return oriented firstly at an angle of slightly less than 45° (around 40°) and a second time at an angle of around 70° relative to the preceding part.

The free ends of the two prongs do not have sharp angles but rounded angles.

These prongs are designed so as to be more flexible than the fins 14. When clip-fastening the trim, these prongs thus deform elastically so as to pass the ends 15 of the fins 14.

The prongs thus act in a manner of a spring, permanently exerting a reaction force, thereby enabling the clip to be fitted while absorbing the tolerances and also permanently keeping the trim on the clip, despite the vibrations when the vehicle is traveling.

Figure 12:
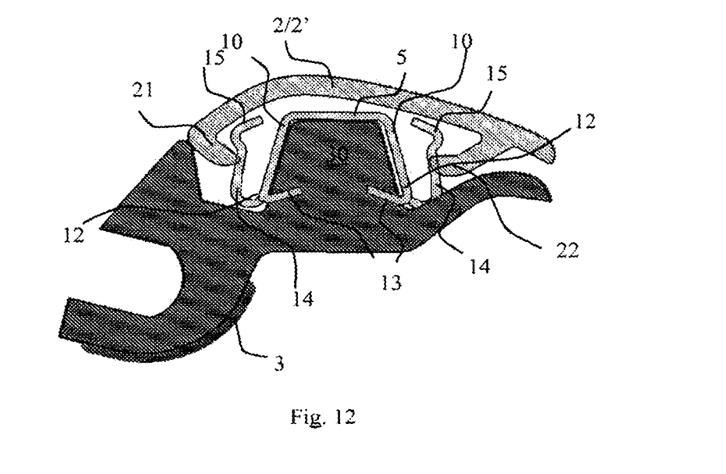
FIG. 12 illustrates a sectional view of the profiled strip of the catching tabs of the clip of FIG. 2 after the trim has been clip-fastened.

FIG. 12 illustrates the completed fitting operation after the three essential steps.

The present invention has been described above by way of example. Of course, a person skilled in the art is capable of forming various alternative forms of the invention without thereby departing from the scope of the patent as defined by the claims.

The invention claimed is:

1. A glazing pane fastener comprising:
   at least one intermediate fastening device to fit an attachment, or a trim, onto a portion of a profiled strip, or onto a portion of a profiled strip fastened to a periphery of the glazing pane,
   wherein the at least one intermediate fastening device includes at least one clip having at least an upstream cooperating part to cooperate with the profiled strip and a downstream cooperating part to cooperate with the attachment or the trim, the intermediate fastening device including at least one slot that isolates the upstream cooperating part from the downstream cooperating part so that the upstream cooperating part is independently deformable relative to the downstream cooperating part, wherein the upstream cooperating part includes a plurality of catching tabs joined to a base, the plurality of catching tabs each having a hook-shaped part and an inward facing end pointing away from a plane of the base that is independently deformable relative to the downstream cooperating part by applying a force to each hook-shaped part and inward facing end toward a material of the profiled strip and in two opposed directions toward a central axis of the at least one intermediate fastening device, wherein the plurality of catching tabs are configured to be deformed, while the downstream cooperating part remains immobile, to penetrate the material of the profiled strip with the inward facing ends during fastening of the at least one clip onto the profiled strip such that the inward facing ends point toward the plane of the base, wherein the clip is symmetrical with respect to a first side and a second side of a longitudinal plane extending along a length, of the clip, the first side surface being on an opposite side of the longitudinal plane from the second side surface, wherein each of the first side and the second side includes at least one upstream cooperating part to cooperate with the profiled strip and includes a downstream cooperating part to cooperate with the attachment or the trim, wherein the intermediate fastening device includes at least one slot, on each of the first side surface and the second side surface, the downstream cooperating part on each of the first and second side surfaces being positioned within the slot on the respective first and second side surfaces, wherein the hook-shaped part is disposed between the base and the inward facing end of each respective plurality of catching tabs, wherein the downstream cooperating part includes at least one pair of opposed fins joined to the base, and wherein a distance between the at least one pair of opposed fins is greater than a width of the base, and wherein the profiled strip is made of a flexible polymer material.

2. The glazing pane fastener as claimed in claim 1, wherein the at least one intermediate fastening device includes a substantially flat base, the plurality of catching tabs being oriented substantially perpendicular to the base, and wherein the plurality of catching tabs are arranged in diametrically opposed pairs relative to a central plane of longitudinal symmetry of the base.

3. The glazing pane fastener as claimed in claim 1, wherein the hook-shaped parts are bent away from a central plane of the base at an angle of between 30° and 70°.

4. The glazing pane fastener as claimed in claim 1, wherein the plurality of catching tabs terminate, at respective inward facing ends that penetrate into the material of the profiled strip, in a plurality of pointed teeth.

5. The glazing pane fastener as claimed in claim 1, wherein at least one slit is disposed on one tab of the plurality of catching tabs between the base and the inward facing end of the one tab of the plurality of catching tabs.

6. The glazing pane fastener as claimed in claim 1, wherein at least one slit is disposed on each tab of the plurality of catching tabs between the base and respective inward facing ends of the plurality of catching tabs.

7. The glazing pane fastener as claimed in claim 1, wherein the downstream cooperating part includes at least one pair of opposed fins joined to the base, and wherein a distance between the at least pair of opposed fins is greater than a width of the base.

8. The glazing pane fastener as claimed in claim 1, wherein the inward facing end of each respective plurality of catching tabs includes at least two teeth.

9. The glazing pane fastener as claimed in claim 8, wherein the inward facing end of each respective plurality of catching tabs includes two solid triangular teeth and two triangular semi-teeth.

10. The glazing pane fastener as claimed in claim 1, wherein a maximum height of the downstream cooperating part extending away from the base is greater than or equal to a maximum height of the upstream cooperating part extending away from the base.

\* \* \* \* \*